United States Patent [19]
Tschannen

[11] 3,779,612
[45] Dec. 18, 1973

[54] TRAILER BRAKE CONTROL SYSTEM

[75] Inventor: Hans Tschannen, Gorgier, Switzerland

[73] Assignee: Beka St-Aubin S.A., St-Aubin, Neuchatel, Switzerland

[22] Filed: May 17, 1971

[21] Appl. No.: 143,818

[30] Foreign Application Priority Data
May 19, 1970 Switzerland.................. 7394/70
Apr. 23, 1971 Switzerland.................. 5961/71

[52] U.S. Cl........ 303/21 CG, 188/3 R, 188/181 A, 303/7, 303/20, 303/24 A
[51] Int. Cl............................................... B60t 8/12
[58] Field of Search ............... 188/3 R, 106 P, 112, 188/18 A; 250/215, 231 R, 231 P; 303/3, 4, 303/7, 13, 15, 20, 21 BE, 21 CG, 24 R, 24 A; 324/162; 340/262

[56] References Cited
UNITED STATES PATENTS
3,486,799  12/1969  Greentree............................. 303/7
3,574,414  4/1971   Jacob..................................... 303/7
2,032,177  2/1936   Logan, Jr............................. 303/24 A
2,193,910  3/1940   Wilson .............................. 303/21 CG
3,275,835  9/1966   Morrison ......................... 250/215 X

FOREIGN PATENTS OR APPLICATIONS
2,024,406  12/1970  Germany ............................ 188/112

Primary Examiner—Trygve M. Blix
Assistant Examiner—Stephen G. Kunin
Attorney—Werner W. Kleeman

[57] ABSTRACT

A trailer brake control system for a tractor-trailer arrangement which comprises a deceleration transmitter located at the tractor for generating electrical signals as a function of the braking or deceleration action exerted at the tractor. An electronic circuit serves to amplify the generated electrical signals. Mechanisms responsive to the amplified electrical signals serve to operate braking apparatus arranged at the trailer.

1 Claim, 6 Drawing Figures

INVENTOR
HANS TSCHANNEN
BY werner w. kleeman
ATTORNEY

TRAILER BRAKE CONTROL SYSTEM

BACKGROUND OF THE INVENTION

The present invention broadly relates to brake control systems for motor vehicles and, more particularly, deals with a new and improved trailer brake control system.

The prior art has already proposed different trailer brake control devices or systems which are controlled pneumatically by the tractor vehicle. Yet, the state-of-the-art trailer brake control system proposed previously possess the disadvantage that they require a rather long response time. In brake systems which have been constructed for the tractor- and trailer vehicles, it is readily possible to hydraulically control the trailer brake control system from that of the traction vehicle. However, in the event that a trailer brake control system is to be subsequently mounted at the hydraulic brake circuit of the traction vehicle then, as a practical matter, difficulties arise, primarily because the manufacture of the vehicles will not honor any guarantee as soon as modifications are undertaken at the original brake system. Therefore, repair service stations also refuse to undertake such modifications at the brake system of such vehicles. Similar problems would arise if a mechanical-electrical transmitter is connected, through similar modifications at the hydraulic brake system of the tractor vehicle, and from which transmitter then the trailer brake control system would be controlled.

SUMMARY OF THE INVENTION

Accordingly, it will be recognised that there is still present a real need in the art for a trailer brake control device or system which is not associated with the aforementioned disadvantages of the prior art and which satisfactorily fulfills the need still existent in the prior art. Hence a primary object of this invention is to provide just such trailer brake control system which satisfactorily and reliably fulfills the need in the art and overcomes the aforementioned drawbacks prevailing in the state-of-the-art devices of this type.

Still another and more specific object of the present invention relates to the provision of a novel trailer brake control system which affords acceptable economies concerning manufacturing and installation costs, which possesses a short response-time and therefore is primarily electrically controlled, and additionally, wherein the novel brake control system of the invention does not require any modification or alteration at the hydraulic brake system of the tractor vehicle.

The invention is based upon the concepts of electrically measuring the decelerations arising upon braking a tractor vehicle, hereinafter sometimes briefly simply referred to as tractor, electrical signals thereby being produced which in magnitude correspond to the braking deceleration, these signals after amplification then being used to control a trailer brake arrangement functioning at negative pressure or with compressed air. Electrical oscillators and oscillator circuits and transmitters used therewith for electrical signals must be eliminated from consideration right at the outset because of the high cost.

Now, in order to implement these and still further objects of the invention, which will become more readily apparent as the description proceeds, it should be understood that one embodiment of trailer brake control system designed according to the teachings of the present invention is manifested by the feature that there are provided:

a. a mercury-circular pendulum-deceleration transmitter installed at the tractor, this transmitter delivering electrical signals during braking or deceleration of the tractor, wherein the intensity of such electrical signals are approximately inversely proportional to the momentary braking or deceleration of the tractor;

b. electronic means for amplifying these signals;

c. an electromagnet serving as electro-mechanical transducer means, and the armature of which electromagnet moves approximately proportional to the amplified signals in opposition to a return or restoring force; and d. vacuum brake valve means or compressed air brake valve means actuated by the armature of the electromagnet, such brake valve means actuating a vacuum brake cylinder or compressed air brake cylinder respectively.

A preferred physical manifestation of such inventive system or apparatus is further manifested by the features that the electronic means embodies a power transistor, the collector of which is coupled with the winding of the electromagnet, a switching transistor which can be controlled as a function of the brake light switch of the tractor, and a control transistor influenced by the mercury-circular pendulum-braking or deceleration transmitter, and wherein the switching transistor and the control transistor are connected with the base of the power transistor.

Now in accordance with an improved embodiment of the inventive trailer brake control system such is manifested by the features that there are provided:

a. a circular pendulum-deceleration or braking transmitter which is installed at the tractor and which, during braking of the tractor, controls the quantity of light received by a photoelement from a light source supplied by a constant voltage, so that at the photoelement the resistance thereof increases or decreases in proportion to the momentary deceleration or braking of the tractor;

b. electronic means for delivering as a function of the momentary resistance value of the photoelement an electrical signal which is in a predetermined relationship to the momentary deceleration or braking action; and c. an electro-pneumatic transducer means which, as a function of the electrical signal, acts upon a vacuum cylinder or a compressed air brake cylinder, or an electrically actuated brake, which are actuated as a function of the electrical signal.

The photoelement preferably consists of a photoconductive cell, such as a photoresistor. The electronic means preferably comprises an operational amplifier and at least one power transistor. The electro-pneumatic device preferably comprises an electrodynamic transducer which, in cooperation with a reaction unit, is finely mechanically coupled with a pneumatic control element responding with low reactive effect and which in turn acts, via a relay valve, upon the piston of a brake cylinder-piston unit.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
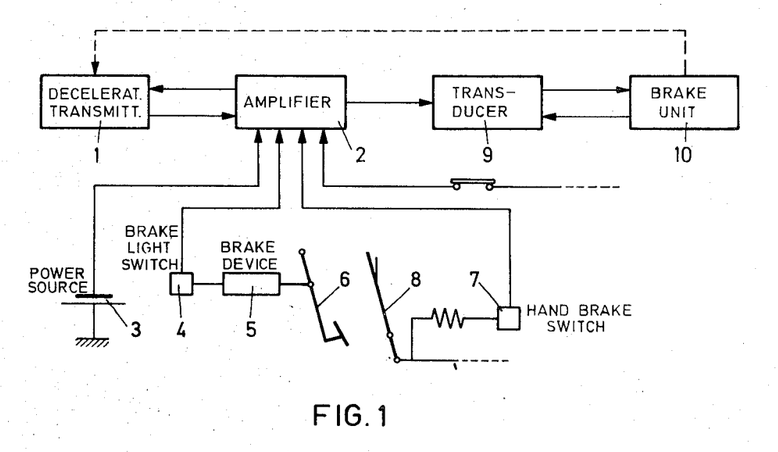
FIG. 1 is a block circuit diagram of a first embodiment of the inventive trailer brake control apparatus or system.
Figure 2:
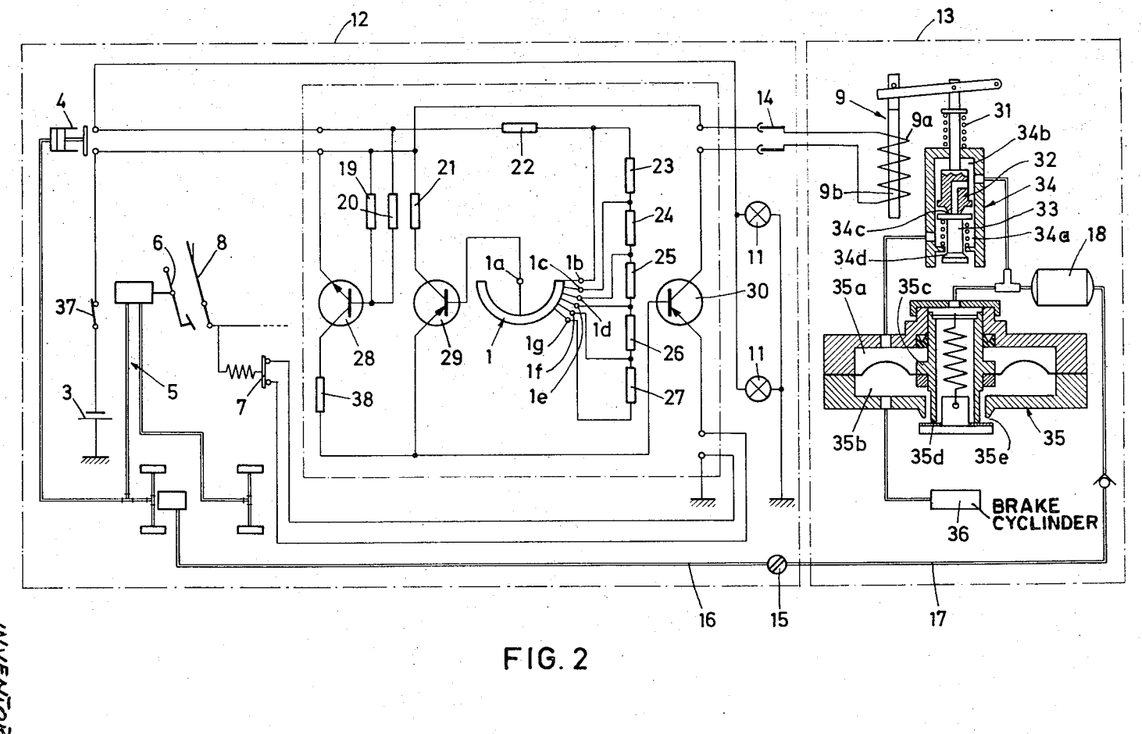
FIG. 2 is a circuit diagram showing details of the system of FIG. 1, and specifically illustrating same equipped with vacuum brake control means at the trailer.
Figure 3:
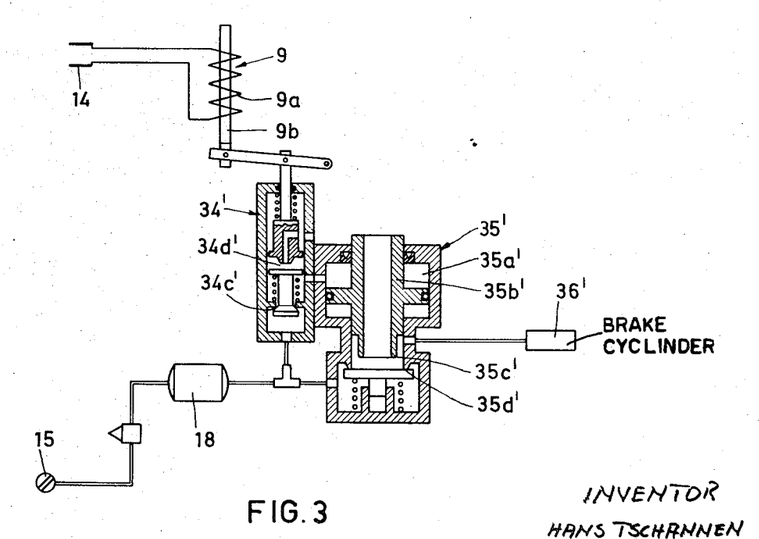
FIG. 3 is a modification of the portion of the system shown at the right of the circuit of FIG. 2, wherein such is equipped with compressed air brake control means.

Describing now the drawings, and considering initially the embodiment depicted in FIGS. 1 to 3 inclusive, it will be understood that with the block diagram of FIG. 1 there has been represented the principles of the construction of this first embodiment of the inventive trailer brake control system. To this end, there will be understood that there is provided a braking or deceleration transmitter, which is here shown as a mercury-circular pendulum-deceleration transmitter 1 which is installed at the tractor or drawing vehicle. This braking or deceleration transmitter 1 responds to each braking or deceleration of the tractor, delivering electrical signals to an electronic amplifier 2, the intensity of which is approximately inversely proportional to the momentary deceleration or braking of the tractor. A power source, such as a battery 3 serves to supply power to the amplifier 2. Reference character 4 denotes a brake light switch means which is responsive in the normal manner to actuation of the hydraulic brake device 5 of the tractor through the agency of the foot or board plate 6. There is also provided a switch means 7 which is responsive to actuation of the hand brake device 8 of the tractor. Reference character 9 indicates a transducer which here consists of electromagnetic means and is supplied by the amplifier 2 with the amplified electrical signals, transducer 9 having an armature which is moved approximately proportional to the intensity of the amplified signals against the restoring force of a spring, as will be more fully explained hereinafter. Also illustrated in FIG. 1 there is provided vacuum brake valve means or compressed air brake valve means, indicated at reference character 10, which are controlled by the transducer 9 and which act upon vacuum- or compressed air brake cylinder means of the trailer, again as will be more fully explained hereinafter. Amplifier 2 only functions when the brake light switch means 4 is closed, on the other hand does not function when the switch means 7 is closed owing to actuation of the hand brake device 8.

Turning now to the circuit diagram of FIG. 2 which provides details of the arrangement illustrated in block form in FIG. 1 it will be seen that once again reference character 3 designates the power supply battery, reference character 5 the hydraulic brake system of the tractor together with the associated foot board or plate 6, the brake light switch means 4 and the brake lights 11, reference character 8 indicating the hand brake device with the associated switch means 7. The block 12 shown in phantom lines at the left of FIG. 2 contains the components of the system which are installed at the tractor, while the block 13 shown similarly in phantom lines but at the left of FIG. 2 contains the components of the system installed at the trailer. Reference character 14 denotes an electrical conductor coupling arrangement for coupling the relevant electrical components of the system located at the tractor with the transducer. Reference character 15 indicates a hose conduit coupling arrangement which connects a negative pressure line 16 coupled with the suction pipe of the tractor engine with a line or conduit 17 connected with a negative pressure container 18. Here also the mercury-circular pendulum-deceleration transmitter is designated by reference character 1. This deceleration transmitter 1 functions in such a manner that the mercury, during zero deceleration or braking, connects contact 1a with contact 1b, but as the braking or deceleration increases contact 1a is successively connected with the further contacts 1c, 1d, 1e, 1f, and 1g. Reference characters 38, 19, 20, 21, 22, 23, 24, 25, 26 and 27 represent different electrical resistors, wherein the last five resistors 23, 24, 25, 26 and 27 are associated with the braking or deceleration transmitter 1.

The electrical arrangement will also be understood to contain a switching transistor 28, here in the form of a npn-transistor, which is controlled as a function of the brake light switch means 4, a pnp-control transistor 29 influenced by the deceleration transmitter 1, and a pnp-power transistor 30, the collector of which is operatively coupled with the winding 9a of the electromagnetic transducer means 9. Now when the electro-magnetic-transducer means 9 is energized the armature 9b thereof is attracted against the restoring force of a spring 31. The armature 9b then acts upon the movable elements 32, 33 of a conventional precontrol valve unit 34 which functions in force-reactive manner and the output of which is connected with the input of a conventional relay valve 35 which, in turn, has its output operatively coupled with the vacuum brake cylinder or cylinders 36 of the vehicle.

The mode of operation of the electrical hardware of the described system is as follows:

Now if neither the foot brake 6 or the hand brake 8 of the tractor is actuated, then the emitter of the power transistor 30 is connected via switch means 7 with ground, that is to say with the positive terminal of the supply battery 3 and its collector is connected via the winding or coil 9a and the ignition switch 37 with the negative pole or terminal of battery 3. A maximum current flow exists through the winding 9a. A control current is delivered to the base of the power transistor 30 through the agency of the switching transistor 28 which is conductive, switching transistor 28 having its collector connected via the resistor 38 with the base of power transistor 30, as shown. Switching transistor 28 is conductive because its base is supplied via the voltage divider 19, 20 with a potential which is positive with respect to the collector of the switching transistor 28. The one resistor 19 of this voltage divider 19, 20 is coupled with the negative terminal of the supply battery 3 and the other resistor 20 has suppled thereto a positive potential through the agency of a terminal of the brake light switch means 4 and the brake light lamps 11. The base of the control transistor 29 has delivered thereto a potential which is positive in relation to its emitter, this causing the control transistor 29 to be non-conductive independent of the operating condition of the braking or deceleration transmitter 1.

Now if upon actuation of the foot brake of the traction vehicle or tractor the brake light switch means 4 is closed, then, on the one hand the resistor 20 of the voltage divider 19, 20 is connected with the minus terminal of the supply battery 3, with the result that the base of the switching transistor 28 is no longer positively pre-biased and this switching transistor therefore is blocked and, on the other hand, the base of the control transistor 29 has delivered thereto a negative potential or voltage via the resistors 22 to 27 and the deceleration or braking transmitter 1, whereby depending upon the braking or deceleration of the tractor which has been discerned at the deceleration transmitter 1 a larger or smaller number of the resistors 22 to 27 will be connected in series. For instance, if the brake peddle is only slightly tapped, so that although the brake lights 11 light up, still no real braking or deceleration occurs, then only the resistor 22 is connected in series with the base of the control transistor 29 and the current flowing through this control transistor 29, and which is delivered to the base of the power transistor 30, is practically of the same magnitude as that current which previously flowed through the conductive switching transistor 28. The excitation current at the electromagnet winding 9a has momentarily remained the same. However, as a function of the increasing braking or deceleration one or more of the further resistors 23 to 27 will be connected in series with the base of the control transistor 29, so that the control current for the power transistor 30 becomes smaller as the braking or deceleration increases. The excitation current flowing through the electromagnet winding 9a also becomes proportionally smaller as a function of the decrease of the control current.

For reasons of security the above-described electrical portion of the system functions according to the so-called rest current principle. In the event that the power supply or a circuit component becomes inoperable then automatically braking of the trailer is initiated.

The mode of operation of the mechanical-pneumatic portion of the system illustrated at the right of FIG. 2 and serving to supply the brake cylinder with negative pressure need only be briefly considered and is as follows:

If no braking action is initiated then the force of the spring 31 is of the same magnitude as the then small force of the electromagnet 9. Atmospheric pressure prevails in the chambers or spaces 34a, 34b of the pre-control valve 34 and in the chambers or spaces 35a, 35b of the relay valve 35.

As the braking or deceleration action increases, as explained above, the force exerted by the electromagnet 9 becomes smaller. Therefore, the pre-control valve spindle 32 is increasingly raised by the action of the spring 31, and the opening at the supply seat 34c is increasingly enlarged or opened and that at the venting or aeration seat 34d is closed. Thus, within the chamber or compartment 35a of the relay valve 35 there prevails a more or less large negative pressure or vacuum, the diaphragm piston 35c is raised, the opening at the supply seat 35d is open and that at the venting seat 35e is closed. The more or less large negative pressure or vacuum is supplied to the brake cylinder 36.

The mode of operation of the mechanical-pneumatic portion of the system illustrated in FIG. 3 and designed for delivering compressed air to the brake cylinder is as follows:

In the non-braked condition of the system atmospheric pressure at the pre-control valve 34' moves through the opening at the venting seat 34d' (the supply seat 34c' is closed) and arrives at the compartment 35a' of the relay valve 35'. The valve element 35b' of the relay valve 35' is then raised and only atmospheric pressure moves through the opening at the venting seat 35c' (that at the supply seat 35d' is closed) and enters the brake cylinder 36'.

When there has been attained a more or less braked condition then compressed air moves out of the container 18' through the opening of the supply seat 34c' of the pre-control valve 34' (that at the venting seat 34d' is closed) and arrives at the compartment 35a' of the relay valve 35'. Hence at the relay valve 35' the reaction piston 35b' is downwardly displaced, while closing the opening at the venting seat 35c' and opening that opening at the supply seat 35d'. Consequently, the brake cylinder 36' is more or less markedly impinged with compressed air.

Figure 4:
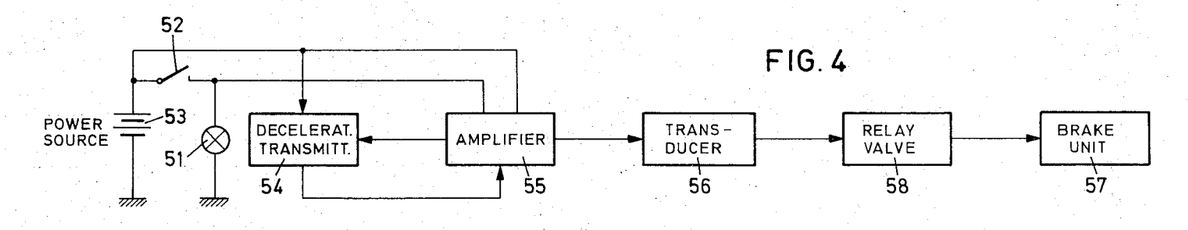
FIG. 4 is a block circuit diagram of a second embodiment of the inventive system.
Figure 5:
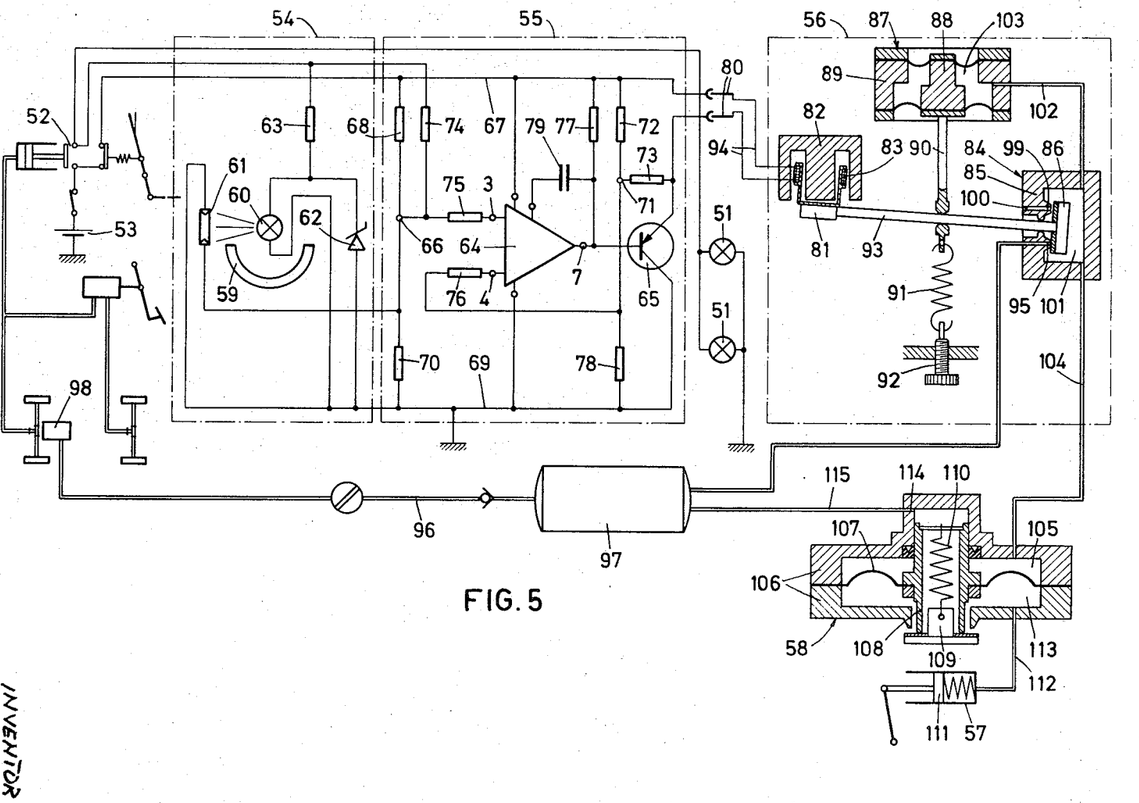
FIG. 5 is a circuit diagram illustrating details of the system depicted in FIG. 4, and specifically equipped with vacuum brake control means at the trailer.

Attention is now directed to the embodiment depicted in FIGS. 4 and 5. As is usual, in that embodiment tail or brake lights 51 are connected via a brake light switch 52 to a power source, here shown as the battery 53. At a circular pendulum-deceleration indicator or transmitter 54 which is to be installed at the tractor and supplied with a stabilized voltage there is produced an electrical signal which is proportional to the deceleration which occurs during braking of the tractor vehicle. This signal is delivered through the agency of an input voltage divider to an amplifier 55, as will be explained more fully hereinafter. The signal which has been amplified at the amplifier 55 controls an electro-pneumatic transducer arrangement 56 which produces a force proportional to this signal. With maximum signal intensity, which occurs at an indirect braking system during the non-braked condition, this force is in equilibrium with a spring force and there does not appear any resultant force at a control valve forming the last element of the electro-pneumatic transducer arrangement 56. As the signal intensity decreases the force delivered at the electro-pneumatic transducer arrangement 56 also decreases. Between the constant spring force and the decreasing force there exists a resultant differential force which can be used for actuating the control valve, such control valve being practically reactive free in the sense that the input pressure and the output pressure practically have no influence upon the actuation force. At the electro-pneumatic transducer arrangement 56 the output pressure of the control valve is delivered to a differential diaphragm piston system. At this differential diaphragm piston system the output pressure produces a force which is equal to that of a preceeding connected electro-dynamic transducer, and additionally such force is directed opposite to the force of the spring.

Owing to the feedback of the output pressure of the control valve there is ensured that such, during a reduction in force of tYe electro-dynamic transducer, will be controlled for such length of time until the control pressure at the differential piston system produces a force which corresponds to the reduction in force of the electro-dynamic transducer. A reduction or increase of the signal intensity at the input of the electro-dynamic transducer thus produces an exact corresponding reduction or increase, respectively, of the pressure in the control valve, provided that the trailer is equipped with a vacuum brake device. When using a compressed air brake device or system a decrease in force at the transducer results in analogous fashion in an increasing pressure at the control valve. In order to obtain a characteristic of the control valve which is as free as possible of feedback and hysteresis it is necessary to select the throughflow cross-section at the control valve to be very small; the throughflow quantities are insufficient for directly controlling the brake cylinder 57 of the trailer. Therefore, there must be connected between the control valve of the electro-pneumatic transducer arrangement 56 and such brake cylinder 57 a relay valve 58 of known construction.

Now while referring in particular to the circuit diagram of FIG. 5 the details of the construction of this embodiment of inventive trailer brake control system will now be considered. Initially, it is to be assumed that the apparatus construction depicted in FIG. 5 is located in its rest condition, in other words the brake light switch 52 is open, characteristic of the non-braked condition. The deceleration indicator or transmitter 54 will be seen to embody a circular pendulum 59 which, during deceleration or braking of the tractor, oscillates about an electrical light source 60, thereby screening to a greater or lesser extent the quantity of light which thus is directed from this light source 60 and falls upon a photoconductive element here shown as the photoresistor 61. In order to stabilize the supply voltage for the light source 60 there are provided Zener diode 62 and a resistor 63.

Now the amplifier 55 discussed above will be seen to embody as its primary components an integrated operational amplifier 64 and at a subsequently connected power stage a transistor 65. An input voltage divider 68, 70 is associated with the operational amplifier 64 and at which, as can be seen by referring to the circuitry of FIG. 5, a resistor 68 is arranged between the junction 66 and the supply conductor 67, and between the junction 66 and a conductor 69 connected to ground the photoresistor 61 and a standard resistor 70 in parallel connection. Furthermore, there is provided a feedback voltage divider in which there is arranged to each side of the junction 71 the resistors 72 and 73 respectively. At the circuit of the amplifier 55 which is of known construction there are additionally provided the auxiliary- and protective resistors 74 to 78 and a capacitor 79. The output terminals of this amplifier 55 are indicated at 80.

Now when the brake peddle is not actuated then the brake light switch 52 is open. In this rest condition the one terminal of the light source 60 is electrically coupled through the agency of the resistor 63, the brake light 51 and ground with the positive terminal or pole of the battery 53 and the other terminal of the light source 60 is directly connected via ground likewise with the positive terminal or pole of the battery 53. Hence the light source 60 does not illuminate. Consequently, no radiation of light appears at the photoresistor 61 and such possesses a large resistance. At the junction 66 of the input voltage divider, the resistor 68 of which is connected via the supply conductor 67 with the positive pole of the battery 53, there appears a voltage which is positive with respect to ground, because the junction point between the resistors 70 and 74 and the photoresistor 61 with which these resistors 70, 74 are connected in parallel, is connected with ground.

The voltage which appears at the junction 66 is delivered through the agency of the protective resistor 75 to the non-inverting input 3 of the operational amplifier 64. At the output 7 of this operational amplifier 64 there are connected a load resistor 77 and the base of the transistor 65 of the power stage. The collector of this transistor 65 is connected with ground and the emitter is connected through the agency of the immersion or dip coil 83 of the hereinafter to be described transducer arrangement 56 with the supply conductor 67. The feedback voltage divider encompassing the resistors 72 and 73 is connected in parallel with respect to the immersion coil 83 and the feedback voltage which is tapped-off at the junction 71 of such voltage divider is delivered to the inverted input 4 of the operational amplifier 64 through the agency of the protective resistor 76.

The resistors which form the input voltage divider and the feedback voltage divider are designed such that during the above-described rest condition the voltage delivered to the non-inverting input 3 of the operational amplifier 64 is just large enough in magnitude that a voltage drop appears across the load resistor 77 which is sufficient to practically completely render the transistor 65 conductive. Therefore, the current flowing through the immersion coil 83 assumes is maximum value during the rest condition. The feedback ensures that the entire amplifier 55 will possess a constant gain or amplification factor, even then if the voltage delivered by the battery 53 fluctuates. The capacitor 79 reduces amplification at high frequencies, resulting in a suppression of the tendency to oscillate brought about by the feedback.

The electro-pneumatic transducer device 56 possesses as its primary components an electro-dynamic transducer 81 equipped with a permanent magnet 82 and the immersion coil 83, furthermore a control valve 84 with a housing 85 and a plate-shaped movable valve element 86, and finally a reaction unit 87. The reaction unit 87 is equipped with a differential diaphragm piston 88 operating within a housing 89 and possessing a rod member 90 which at its free end is connected with one end of a tension spring 91. The other end of this tension spring 91 is suspended at an adjustment screw 92 serving to regulate the pre-bias of this spring 91.

A rod member 93 carrying the effective element, namely the movable valve element 86 of the control valve 84 is mounted to be tiltable in close proximity to this effective element 86 at the housing 85. Furthermore, this rod member 93 extends practically without play through the piston rod 90 and carries at its free end the immersion coil 83 of the electro-dynamic transducer 81.

In the rest condition, in other words when the brake light switch is open maximum current is delivered to the immersion coil 83 from the amplifier 55 via the connection conductors 94, resulting in this immersion or dip coil 83 completely immersing into the permanent magnet 82. Consequently, the rod 93 is tilted in clockwise direction about the pivot position at the housing 85 against the resistance of the spring 91. In so doing, the effective valve component 86 during this corresponding tilting or pivoting movement maintains the mouth 95 of a suction line 96 closed. Communicating with this suction line 96 is a vacuum container or vessel 97, vacuum container 97 being connected with a negative pressure source 98, for instance arranged at the drive motor or engine of the tractor. At the same time as the mouth 95 of the suction line 96 is closed by the effective valve component 86 this effective control valve component 86 simultaneously frees the mouth 99 of a channel 100 communicating with atmosphere. Hence, within the compartment 101 of the control valve housing 85 there thus prevails atmospheric pressure. This atmospheric pressure is propagated through a connection line 102 into the compartment or chamber 103 of the reaction unit 87, and furthermore, through the agency of the connection line 104 such atmospheric pressure also prevails at the upper compartment 105 of the relay valve 58. Relay valve 58 is a conventional type valve of known construction and apart from the housing 106 possesses, as usual, a piston diaphragm or membrane 107, movable closure elements 108, 109 and a closing spring 110. This relay valve 58 is provided because the control valve is not suitable for the throughpassage of large quantities of air as such is necessary for the actuation of the piston 111 at the brake cylinder 57. The work compartment of this brake cylinder 57 is connected in flow communication via the connection line 112 with the lower compartment 113 of the relay valve 58. The suction or vacuum air inlet 114 is connected by means of the connection line 115 with the vacuum or negative pressure container 97. When the piston diaphragm 107 is impinged with atmospheric pressure from the compartment 105 then the closure elements 108, 109 of the relay valve 58 assume the illustrated position. Consequently, the chamber 113 communicates with atmosphere, the brake cylinder 57 is vented and therefore the brakes of the trailer are not braked in this condition.

There will now be described the operational condition which prevails when the brake light switch 52 is closed by slightly tapping the brake peddle, but no braking of the tractor, in other words no deceleration thereof, has yet occurred.

Owing to closing of the brake light switch 52, on the one hand the complete battery voltage is applied to the brake or stop light 51 so that such illuminates, and, on the other hand a voltage is applied via the resistor 63 to the light source 60 so that this light source 60 illuminates and the photoresistor 61 is completely impinged with light. Consequently, the resistance of the photoresistor 60 drops to a minimum value. This results in the voltage which is positive with respect to ground and which appears at the non-inverting input 3 of the operational amplifier 64 dropping relatively intensely in accordance with the reduction of the resistance of the photoresistor 61. However, such does not have any influence upon the current which flows through the immersion coil 83 since the transistor 65 is already completely conductive. In order to prevent dropping of the positive voltage at the input 3 of the operational amplifier 64, rather to increase such voltage by an amount so that the current flowing through the immersion coil 83 drops by approximately one-quarter, the junction 66 of the input voltage divider is likewise connected through the intermediary of the resistor 74 with the positive pole or terminal of the battery 53.

Since the current flow through the immersion coil 83 has dropped by about one-quarter with the magnetic field of the permanent magnet 82 remaining unchanged the axial force transmitted by the immersion coil 83 likewise drops by a corresponding amount. Now the tilting moment exerted by the spring 91 upon the rod 83 exceeds the tilting moment exerted by the immersion coil 83. Accordingly the valve element 86 is now tilted in the counterclockwise direction, so that this valve element 86 initially closes the mouth 99 of the channel 100 and then opens the mouth 95 of the suction line 96. Consequently, there is a drop in pressure in the chamber 101 of the control valve 84, the chamber 103 of the reaction unit 87 and the upper chamber 105 of the relay valve 58. A force equilibrium condition prevails at the reaction piston 88 in the reaction unit 87, which approximately is then the case when the pressure in the compartment 101 has dropped by about one-quarter of the atmospheric pressure. The same pressure reduction exists at the compartment 105 of the relay valve 58. At the relay valve 58 initially the closure element 109 comes to bear at the seat of the housing 106 and thereafter the closure element 108 is raised from the closure element 109, resulting in the fact that the chamber 113 together with the connection line 112 and the working compartment of the brake cylinder 57 are placed into communication with the suction line 96. The equilibrium condition at the relay valve 58 prevails as soon as the pressure equilibrium exists in the compartment 105 and 113. Thus, at the brake cylinder 57 there comes into play the negative pressure which amounts to about one-fourth of atmospheric pressure and the brakes of the trailer vehicle are lightly applied.

There will now be described the operations which occur when the tractor is braked owing to actuation of the brake peddle, in other words when a deceleration occurs at the tractor.

Owing to the braking action the circular pendulum 59, the axis of rotation of which is arranged transverse with respect to the direction of travel, is deflected as a function of the magnitude of the braking or deceleration and thereby, again as a function of the magnitude of the deceleration, covers the photoresistor 61 so that the resistance value thereof increases in proportion to the magnitude of the braking or deceleration action. With the increase of the resistance value of the photoresistor 61 the voltage at the junction 66 increases and therefore also at the input 3 of the operational amplifier 64. Since the transistor 65 of the power stage is controlled by means of this voltage drop the current flowing through the immersion coil 83 drops in direct relationship to the amount which the circular pendulum 59 covers the photoresistor 61. During maximum deceleration the current flowing through the immersion coil 83 practically amounts to zero so that, as will be hereinafter explained, the maximum braking action is initiated. Therefore, in analogy to the known compressed air- and vacuum brakes there is ensured for a braking of the unintentionally released trailer.

At the immersion coil 83 of the transducer 81 which is supplied by the amplifier 65 the current flow is inversely proportional to the deceleration or braking of the tractor. During increasing deceleration or braking the magnetic force acting upon the immersion coil 83 drops and in cooperation with the reaction unit 87 there appears at the compartment 101 of the control valve 84 a correspondingly large negative pressure, similar to what has already been described for the operational condition, at which the foot brake is only slightly tapped until illumination of the brake lights. Just as was the case with the description of that mode of operation here also this increased negative pressure is transmitted via the relay valve 58 to the working compartment of the brake cylinder 57 where thus the piston 111 is displaced by an increased force and thereby exerts a correspondingly greater braking action upon the wheels of the trailer.

Owing to the special construction of the control valve 84, namely the tiltable mounting of the rod 93 very near to the plane of the closing surface of the effective valve component 86, this control valve 84 is capable, even in the presence of only very small control forces, of controlling a pressure stably and free of hysteresis. Furthermore, the construction of the control valve provides the additional advantage, in contrast to impact plate systems, that it is relatively free of air losses once a reference value has been regulated.

Figure 6:
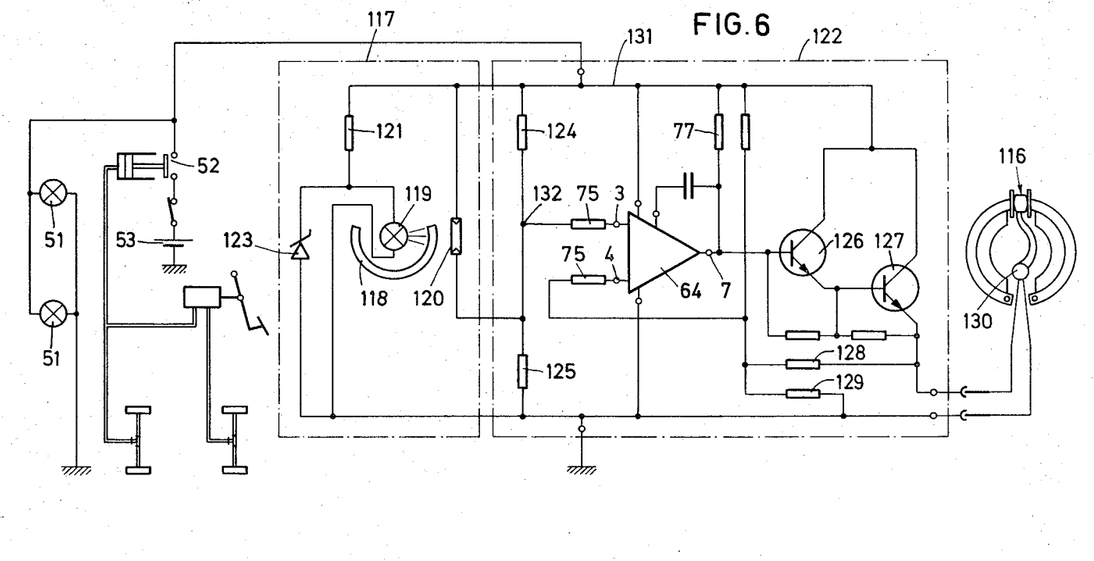
FIG. 6 is a similar circuit diagram to that shown in FIG. 5 of a third embodiment of the invention wherein the trailer is equipped with electrically actuated brakes.

With reference now to FIG. 6 there will be described an embodiment of the invention wherein at the trailer vehicle there is provided an electro-magnetically actuated trailer brake 116 of known construction. Here also the brake or stop lights are indicated by reference character 51, the brake light switch by reference character 52 and the supply battery by reference character 53. Further, a braking or deceleration indicator is collectively represented by reference character 117, this deceleration indicator 117 incorporating a circular pendulum 118 which is arranged at the tractor in such a manner that with increasing deceleration or braking of the tractor an increasing quantity of light arrives from an electric light source 119 at a photoresistor 120. In order to stabilize the supply voltage of the light source 119 there is here also provided a Zener diode 123 which cooperates with a resistor 121. An amplifier arrangement 122 embodies in its circuit an input voltage divider consisting of the resistors 124 and 125, the same operational amplifier 64 as used and discussed above in conjunction with the embodiment of FIG. 5, a power stage possessing the two transistors 126 and 127, and a feedback voltage divider consisting of the resistors 128 and 129. The emitter of the transistor 127 is connected via a winding or coil 130 of the electrically actuated brake device 116 with ground. This brake device 116 is ineffectual during such time as no current flows through its winding 130.

The amplifier 122 and the deceleration indicator or transmitter 117 are supplied via a common supply line or conductor 131 which is connected with the brake lights 51 at the brake light switch 52. When the brake peddle is not actuated the brake light switch 52 is open, the brake lights 51 do not light up and the amplifier 122 as well as the deceleration indicator 117 do not have any voltage applied thereto. Therefore the winding 130 of the brake 116 also does not carry any current.

Now if the brake peddle is actuated and the stop or brake light switch 52 is closed, the stop or brake lights 51 illuminate and the amplifier 122 and the deceleration indicator 117 have applied thereto the battery voltage through the agency of the supply conductor 131. The light source 119 illuminates and as long as no deceleration occurs the photoresistor 120 is not illuminated with light because the circular pendulum 118 covers the light source 119. Photoresistor 120 is connected parallel to the resistor 124 of the input voltage divider 124, 125. The resistance value of the photoresistor 120 during this phase of operation is relatively high. The resistors 124 and 125 are chosen such that at the junction point 132 there is supplied such a voltage which is positive with respect to ground to the input 3 of the operational amplifier 64 through the agency of the protective resistor 75 that at the load resistor 77 at the output 7 of the operational amplifier 64 a small voltage drop occurs which is not capable of controlling the power stage such that an appreciable current will flow through the winding or coil 130.

As the braking or deceleration action increases the photoresistor 120 is more intensely impinged with light. Inversely with respect to the increase of the illumination of the photoresistor 120 with light the resistance value of the photoresistor 120 becomes smaller and the voltage at the junction 132 which is positive with respect to ground increases in proportion to the deceleration. The voltage drop at the load resistor 77 increases and therefore also the current delivered to the winding 130 of the brake 116, this current increase being in direct relationship to the deceleration or braking action. This causes the effective action of the brakes of the trailer to be increased.

While there is shown and described present preferred embodiments of the invention, it is to be distinctly understood that the invention is not limited thereto but may be otherwise variously embodied and practiced within the scope of the following claims, Accordingly,

What is claimed is:

1. A trailer brake control system for a tractor-trailer arrangement, comprising in combination a circular pendulum deceleration transmitter means installed at the tractor and which, during braking of the tractor, controls the quantity of light received by a photoelement from a light source supplied by a constant voltage, so that at said photoelement the resistance thereof increases or decreases in proportion to the momentary deceleration of the tractor; electronic means in circuit with said deceleration transmitter for delivering as a function of the momentary resistance of said photoelement an electrical signal having an intensity which is proportional to the momentary deceleration of the tractor; transducer means which, as a function of such electrical signal, acts upon a braking unit, actuated in proportion to the intensity of such electrical signal, and wherein said braking unit incorporates a brake cylinder containing a piston, said transducer means defining an electro-pneumatic transducer means comprising an electro-dynamic transducer, means for finely mechanically coupling said electro-dynamic transducer substantially reactive free with a control valve, said control valve cooperating with a reaction unit, and wherein said control valve acts through the agency of relay valve means upon said piston within said brake cylinder.

* * * * *